(12) United States Patent
Robertson et al.

(10) Patent No.: US 10,562,618 B2
(45) Date of Patent: Feb. 18, 2020

(54) HELICOPTER WITH WING AUGMENTED LIFT

(71) Applicant: Bell Helicopter Textron Inc., Fort Worth, TX (US)

(72) Inventors: Daniel Bryan Robertson, Southlake, TX (US); Kirk Landon Groninga, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 530 days.

(21) Appl. No.: 15/477,582

(22) Filed: Apr. 3, 2017

(65) Prior Publication Data

US 2018/0281936 A1    Oct. 4, 2018

(51) Int. Cl.

| | |
|---|---|
| *B64C 27/26* | (2006.01) |
| *B64C 9/04* | (2006.01) |
| *B64D 27/24* | (2006.01) |
| *B64D 27/10* | (2006.01) |
| *B64C 27/28* | (2006.01) |
| *B64C 27/82* | (2006.01) |

(52) U.S. Cl.
CPC .............. *B64C 27/26* (2013.01); *B64C 9/04* (2013.01); *B64C 27/28* (2013.01); *B64D 27/10* (2013.01); *B64D 27/24* (2013.01); *B64C 2027/8245* (2013.01); *B64C 2201/024* (2013.01)

(58) Field of Classification Search
CPC .......... B64C 27/26; B64C 27/28; B64C 9/04; B64C 2027/8245; B64C 2201/024; B64D 27/10; B64D 27/24
See application file for complete search history.

(56) References Cited

U.S. PATENT DOCUMENTS

| | | | | |
|---|---|---|---|---|
| 4,720,059 A | * | 1/1988 | Stearns, Jr. ............. | B64C 27/52 244/17.11 |
| 5,244,167 A | * | 9/1993 | Turk ......................... | B64C 9/38 244/12.1 |
| 6,260,793 B1 | * | 7/2001 | Balayn ...................... | B64C 7/00 244/130 |
| 8,376,266 B2 | * | 2/2013 | Gemmati ................. | B64C 27/22 244/17.11 |
| 8,403,255 B2 | * | 3/2013 | Piasecki .................. | B64C 3/385 244/12.3 |

(Continued)

FOREIGN PATENT DOCUMENTS

| | | | | |
|---|---|---|---|---|
| EP | 2690012 | * | 1/2014 | ............. B64C 27/28 |
| EP | 2690012 A1 | | 1/2014 | |

OTHER PUBLICATIONS

Office Action in related European Patent Application No. 17205736.6, dated Feb. 28, 2018, 7 pages.

(Continued)

*Primary Examiner* — Assres H Woldemaryam
(74) *Attorney, Agent, or Firm* — Lightfoot & Alford PLLC (57) ABSTRACT

A helicopter has a fuselage, a main rotor system connected to the fuselage and configured to rotate in a rotor direction, the main rotor system comprising a retreating rotor blade side and an opposing advancing rotor blade side, and a first wing extending from the fuselage on the retreating rotor blade side. The helicopter comprises no tail rotor system and comprises no counter-rotating rotor system coaxial with the main rotor system.

19 Claims, 11 Drawing Sheets

(56) References Cited

U.S. PATENT DOCUMENTS

| | | | |
|---|---|---|---|
| 9,321,526 B2 | 4/2016 | Fink et al. | |
| 2008/0223981 A1* | 9/2008 | Angle | B60V 1/08 |
| | | | 244/16 |
| 2009/0321554 A1* | 12/2009 | Roesch | B64C 27/26 |
| | | | 244/6 |
| 2010/0224720 A1* | 9/2010 | Roesch | B64C 27/26 |
| | | | 244/12.3 |
| 2013/0134253 A1* | 5/2013 | Carter, Jr. | B64C 27/12 |
| | | | 244/17.11 |
| 2014/0061367 A1* | 3/2014 | Fink | B64C 27/26 |
| | | | 244/6 |
| 2014/0346283 A1* | 11/2014 | Salyer | B64C 37/00 |
| | | | 244/7 A |
| 2016/0152329 A1* | 6/2016 | Tzeng | B64C 29/0033 |
| | | | 416/134 R |

OTHER PUBLICATIONS

European Search Report in related European Patent Application No. 17205736.6, dated Feb. 9, 2018, 4 pages.

\* cited by examiner

HELICOPTER WITH WING AUGMENTED LIFT

BACKGROUND

Some rotorcraft comprise tail rotor systems configured to provide anti-torque forces that selectively prevent rotation of the rotorcraft about an axis of a mast. However, providing the tail rotor systems typically includes providing a tail boom or some other structure intended to locate the tail rotor system a radial distance away from a mast axis, thereby increasing an overall size envelope of the rotorcraft. Some rotorcraft further comprise coaxial counter-rotating propellers to combat undesirable rotation of the fuselage of the rotorcraft. Still further, some rotorcraft comprise wings to augment lift in forward flight which can allow a higher top speed in forward flight.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1-6 in the drawings, a helicopter 100 is illustrated. Helicopter 100 comprises a fuselage 102, a landing gear 104, a left wing 106, a right wing 108, a main rotor system 110 comprising main rotor blades 112, a first fan 114 carried by the left wing 106, and a second fan 116 carried by the right wing 108. Each of the left wing 106 and the right wing 108 comprise an inner flaperon 118 and an outer flaperon 120. The main rotor blades 112, first fan 114, second fan 116, inner flaperons 118, and outer flaperons 120 can be controlled in order to selectively control direction, thrust, and lift of helicopter 100.

In operation, the main rotor system 110 of helicopter 100 can be operated to rotate the main rotor blades 112 in a counterclockwise direction as viewed from above and indicated by rotor direction 122. In response to the rotation of the main rotor blades 112, the fuselage 102 tends to react by rotating in a clockwise direction as viewed from above and indicated by fuselage direction 124. In conventional helicopters, the rotation of the fuselage 102 can be countered by operation of a tail rotor system and/or counter-rotating rotor blades. However, helicopter 100 comprises no tail rotor system and no counter-rotating rotor blades. By including no tail rotor, an overall drag of the helicopter 100 is reduced so that higher top speeds can more easily be accomplished. Instead, the first fan 114 and/or the second fan 116 can be operated to counter the fuselage 102 rotation. In particular, the first fan 114 can be operated to exhaust air in a first exhaust direction 126 to urge the fuselage 102 in the first fan rotation direction 128 which is opposite the fuselage direction 124. Similarly, the second fan 116 can be operated to exhaust air in a second exhaust direction 130 to urge the fuselage 102 in the second fan rotation direction 132 which is also opposite the fuselage direction 124. In some cases, the left wing 106 can augment lift in forward flight to counter a rolling moment that is attributable to drag on the retreating side of the main rotor system 110. Accordingly, while helicopter 100 is shown with a right wing 108 substantially similar to left wing 106, in alternative embodiments, a wing configured to produce less lift on the right side can be provided or the right wing 108 may be excluded altogether.

Figure 1:
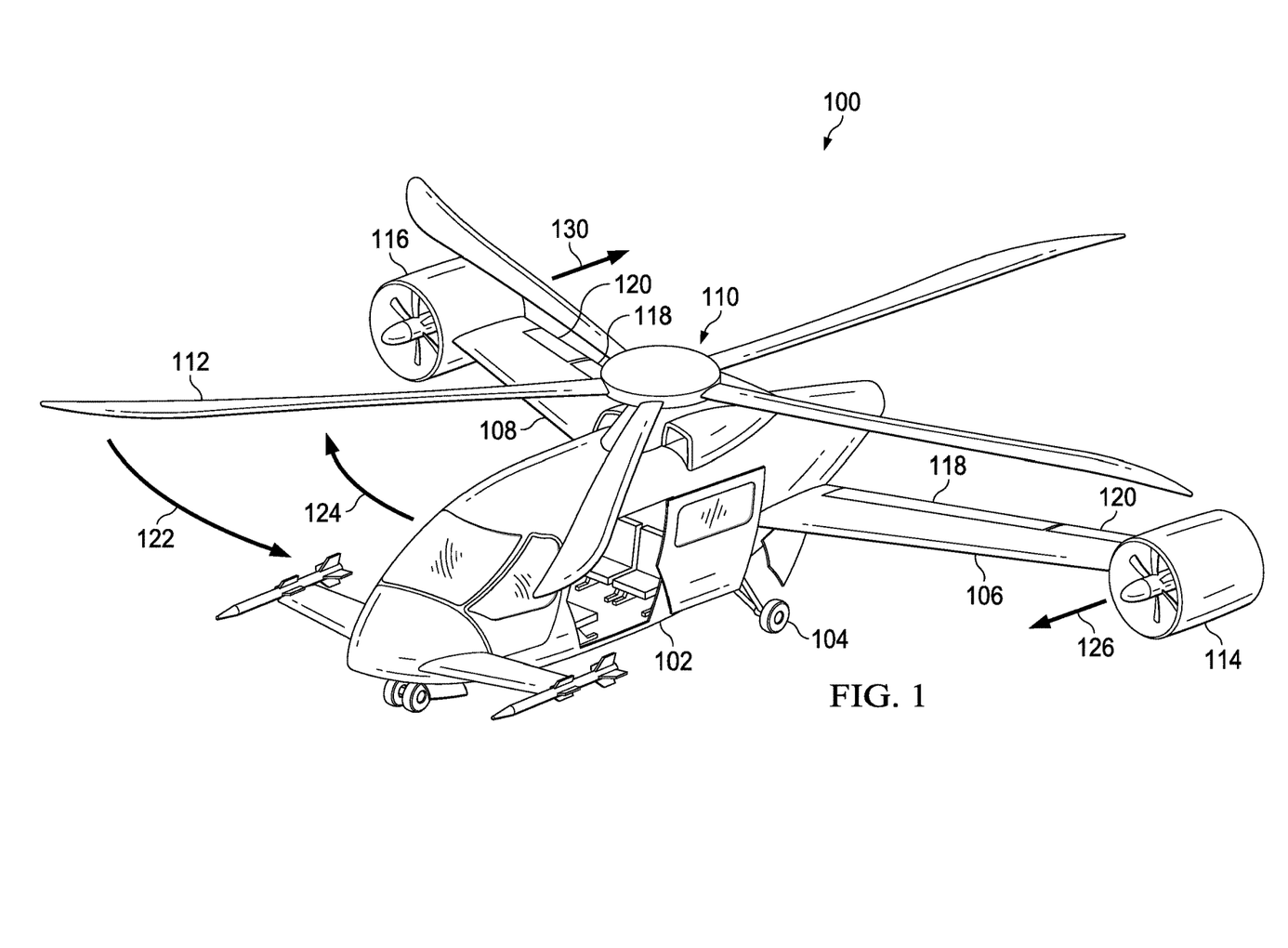
FIG. 1 is an oblique top left view of a helicopter according to an embodiment of the disclosure in a hover configuration.
Figure 2:
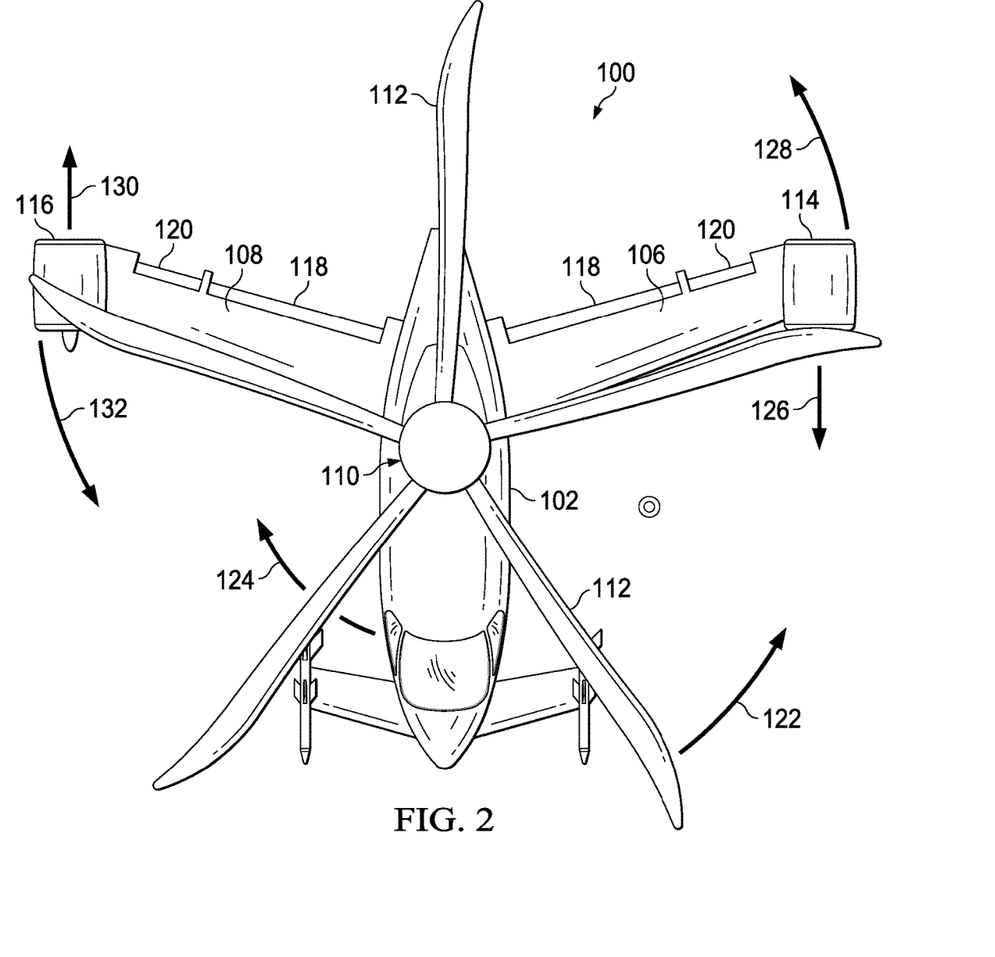
FIG. 2 is an orthogonal top view of the helicopter of FIG. 1.
Figure 3:
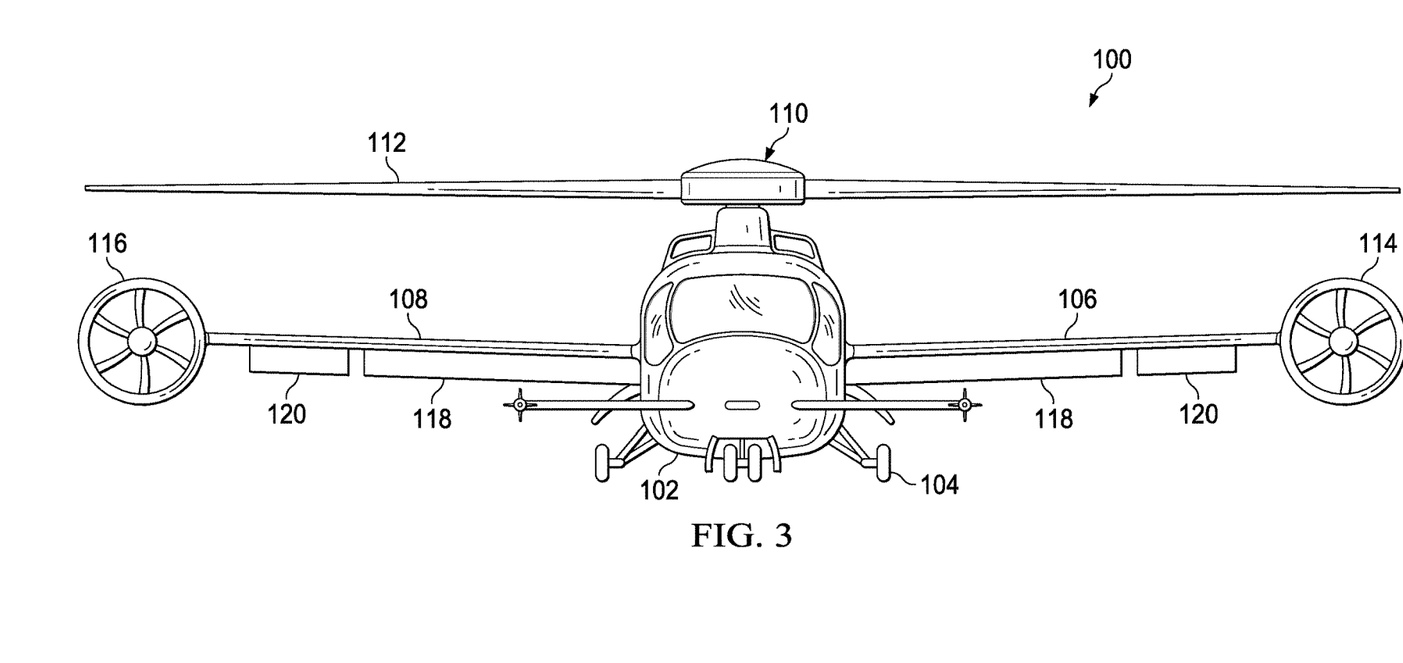
FIG. 3 is an orthogonal front view of the helicopter of FIG. 1.
Figure 4:
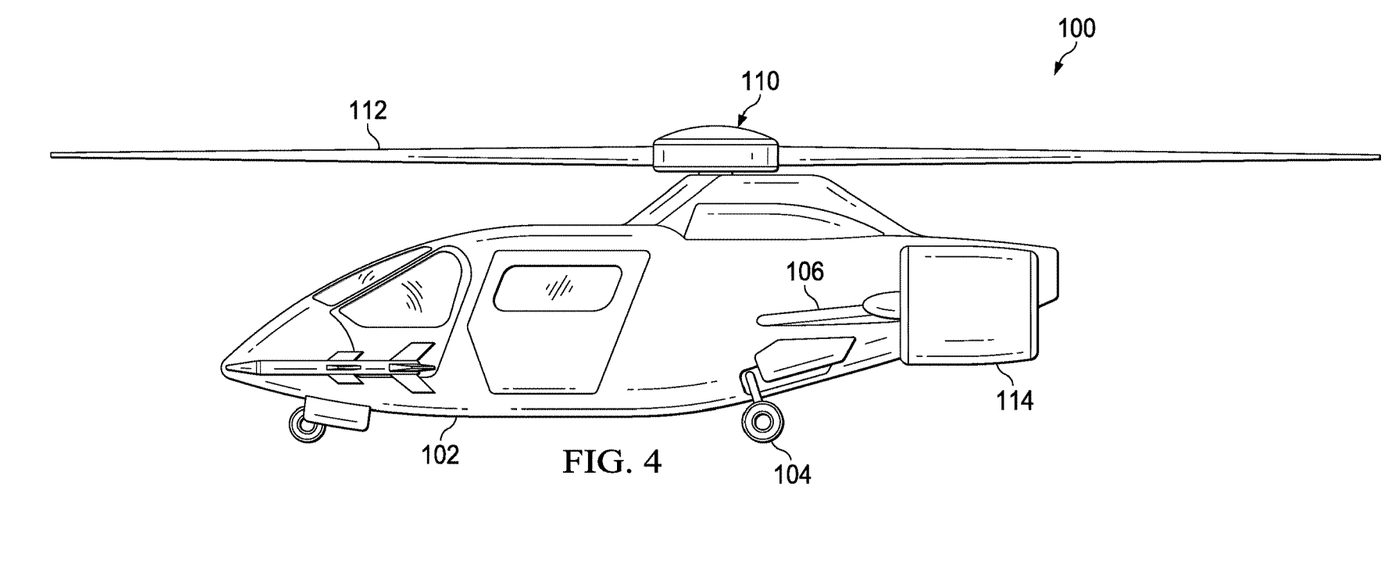
FIG. 4 is an orthogonal left side view of the helicopter of FIG. 1.
Figure 5:
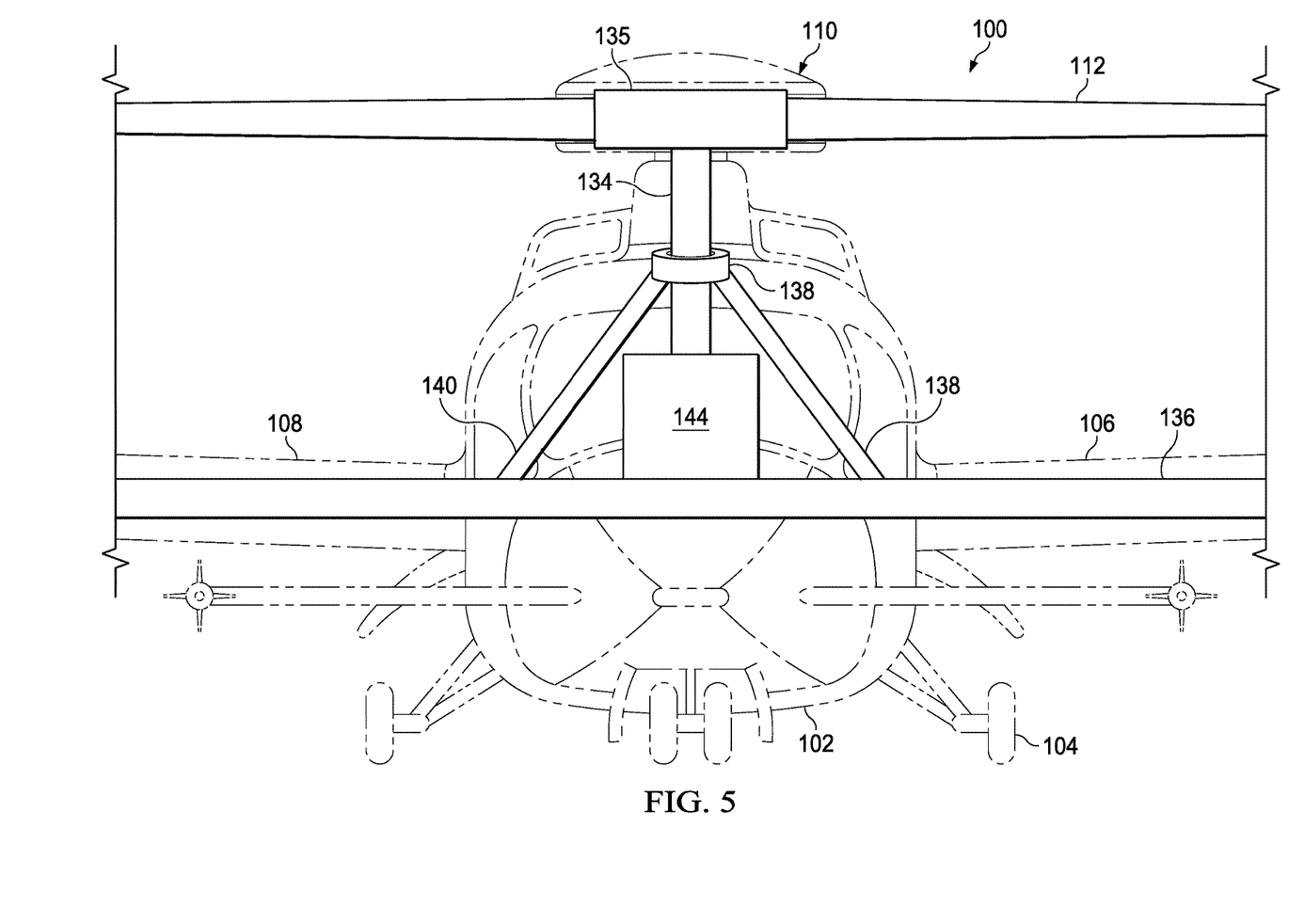
FIG. 5 is an orthogonal front schematic view of a rigid rotor system of the helicopter of FIG. 1.

Referring specifically to FIG. 5, the effective transfer of forces between main rotor system 110 and the wings 106, 108 are accomplished by providing the main rotor system 110 as a rigid rotor system in which hub 135 loads are transferred from the hub 135 to a mast 134, and from the mast 134 to a crossmember 136 that connects the wings 106, 108 to the fuselage 102. In some embodiments, the mast 134 is a normal rotating mast, but bending moments are passed from the mast 134 to a thrust bearing 138 and from the thrust bearing 138 to the crossmember 136 through one or more substantially static links 140 that join the thrust bearing 138 to the crossmember 136. In some embodiments, the above-described linkage between the mast 134 and the crossmember 136 can reduce flapping of the main rotor system 110.

When the helicopter 100 is taking off from a grounded position, the first fan 114 and the second fan 116 can be operated together or alone to produce a desired antitorque result to rotationally stabilize the fuselage 102. However, during forward flight, the first fan 114 and the second fan 116 can both be operated to provide forward thrust so that the helicopter 100 can achieve a higher top speed. During forward flight, the necessary rotational control of the fuselage 102 can be accomplished in a variety of ways. In some cases, the flaperons 118, 120 can be operated to provide more lift on the retreating blade side, in this embodiment, the retreating blade side is the left side due to the direction of rotation of the main rotor blades 112. In some embodiments, during forward flight the first fan 114 can be operated to provide a different amount of thrust as compared to the second fan 116 so that a desired amount of total rotational force is provided by the fans 114, 116. In some embodiments, the first fan 114 can be provided without providing the second fan 116, especially in cases where no right wing 108 is provided. In the embodiments of FIGS. 1-6, the left side can be referred to as the retreating rotor blade side while the right side can be referred to as the advancing rotor blade side.

Figure 6:
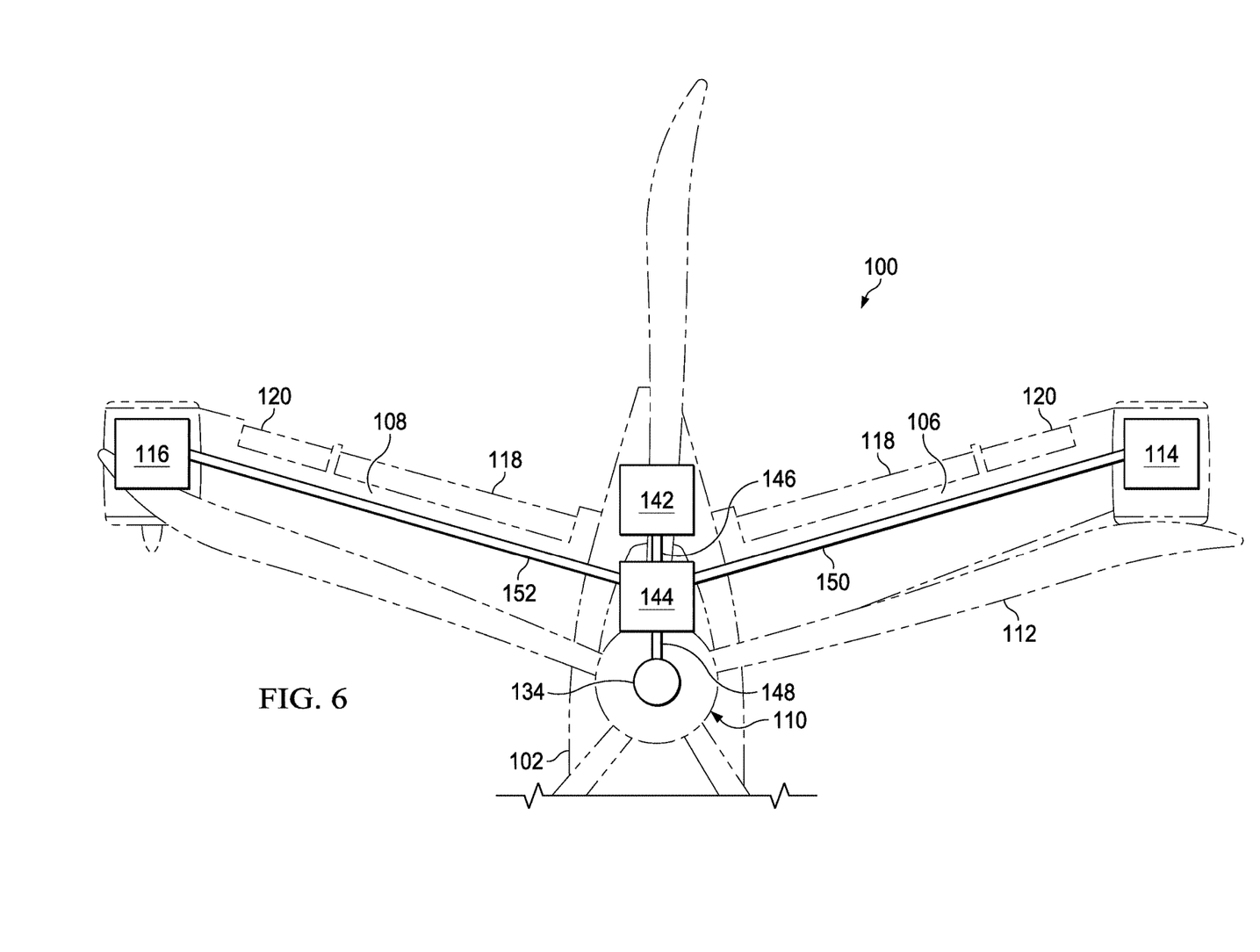
FIG. 6 is an orthogonal top schematic view of a drive system of the helicopter of FIG. 1.

The helicopter 100 generally comprises an engine 142 that can be located centrally in a left-right direction and partially aft of the axis of rotation of the mast 134. The engine 142 is connected to a power splitting transmission 144 via a drive shaft 146. The power splitting transmission 144 is configured to selectively deliver rotational power to each of the mast 134, the first fan 114, and the second fan 116 via transmission linkages 148, 150, 152, respectively. In alternative embodiments, additional engines can be provided and/or the engine 142 can be located differently.

Figure 7:
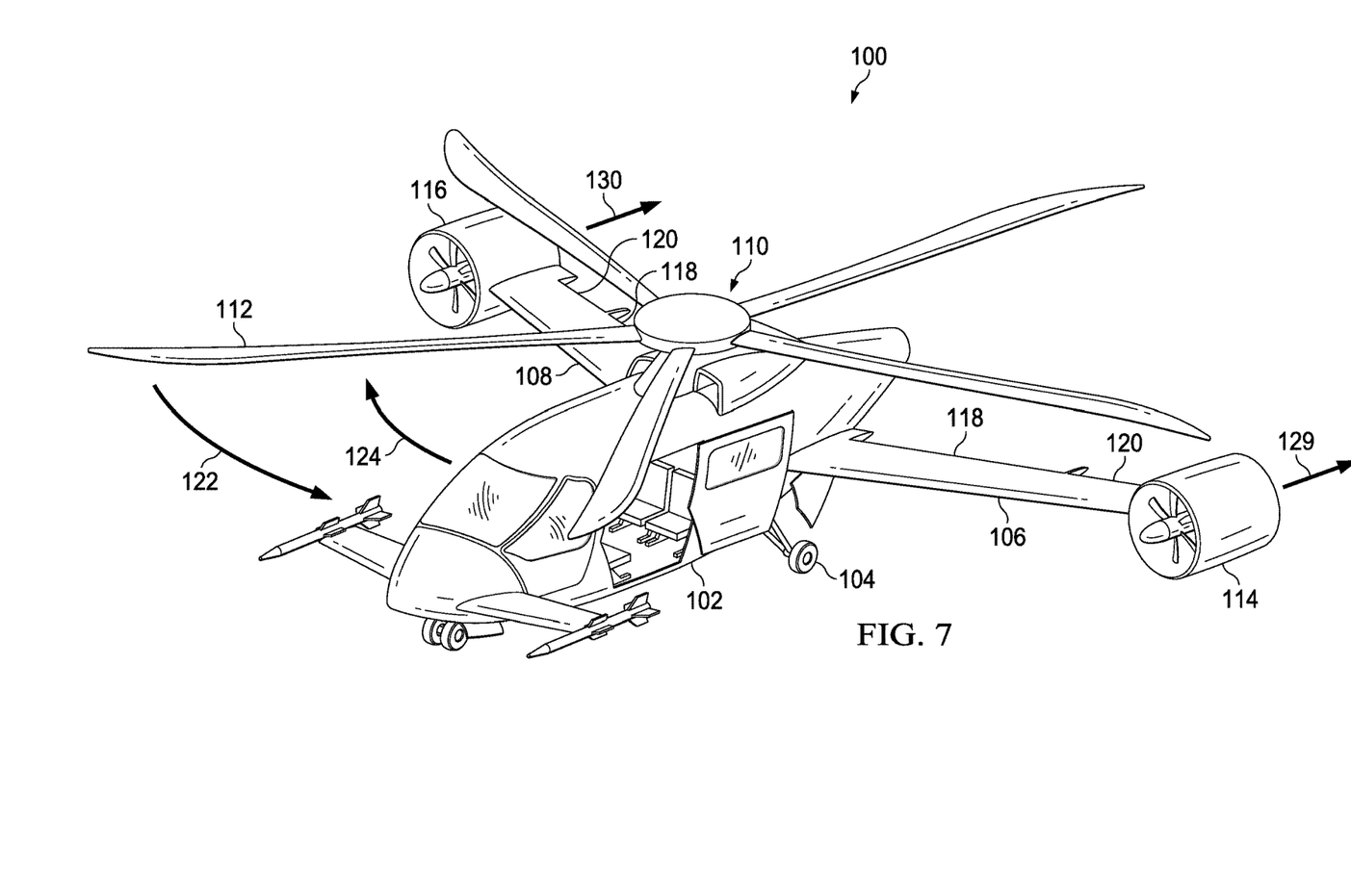
FIG. 7 is an oblique top left view of the helicopter of FIG. 1 in a forward flight configuration.

Referring now to FIG. 7, the helicopter 100 is shown in forward flight mode where both the first fan 114 and the second fan 116 are directing exhaust rearward in a first fan reverse exhaust direction 129 and the second exhaust direction 130, respectively. Additionally, rather than the flaperons 118, 120 being in inactivated positions substantially conforming to the shape of the wings 106, 108, the flaperons 118, 120 are in different positions to provide the desired drag and yaw control.

Figure 8:
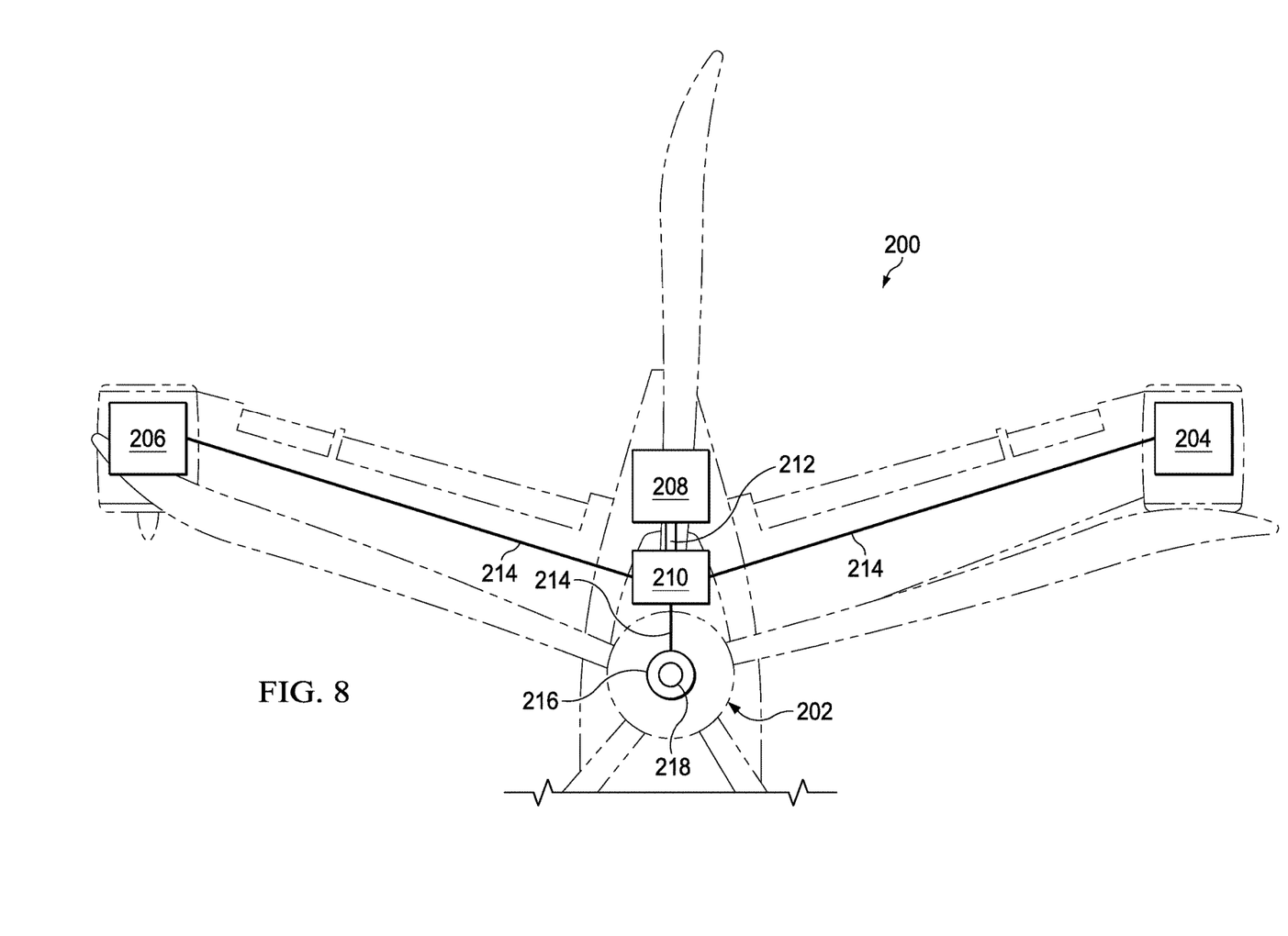
FIG. 8 is a schematic view of another helicopter of the disclosure comprising an electrical generator for driving a main rotor and two electric fans.

Referring now to FIG. 8, a schematic view of an alternative embodiment of a helicopter 200 is shown. Helicopter 200 is substantially similar to helicopter 100, but each of the main rotor system 202, first electric fan 204, and second electric fan 206 are electrically powered. In this embodiment, the helicopter 200 comprises an engine 208 connected to an electrical generator 210 by a power shaft 212. Electrical connections 214 are provided between the electrical generator 210 and each of a main rotor electrical motor 216 and electrical motors of first electric fan 204 and second electric fan 206. The main rotor electrical motor 216 is configured to drive the mast 218. While not shown, electrical connections 214 can also be provided between the electrical generator 210 and electrical motors and/or actuators associated with moving the flaperons. In some cases, the first electric fan 204 and/or the second electric fan 206 are reversible. In cases where the fans 204, 206 are reversible, the fans 204, 206 can comprise an elliptical or nonsymmetrical airfoil. Further, while fans throughout the disclosure are shown as ducted fans, in alternative embodiments, ducted fans can be replaced by propellers and/or any other suitable similarly controllable thrust generator. Furthermore, the term fan can in some embodiments be generalized and replaced by the term thrust generator.

Figure 9:
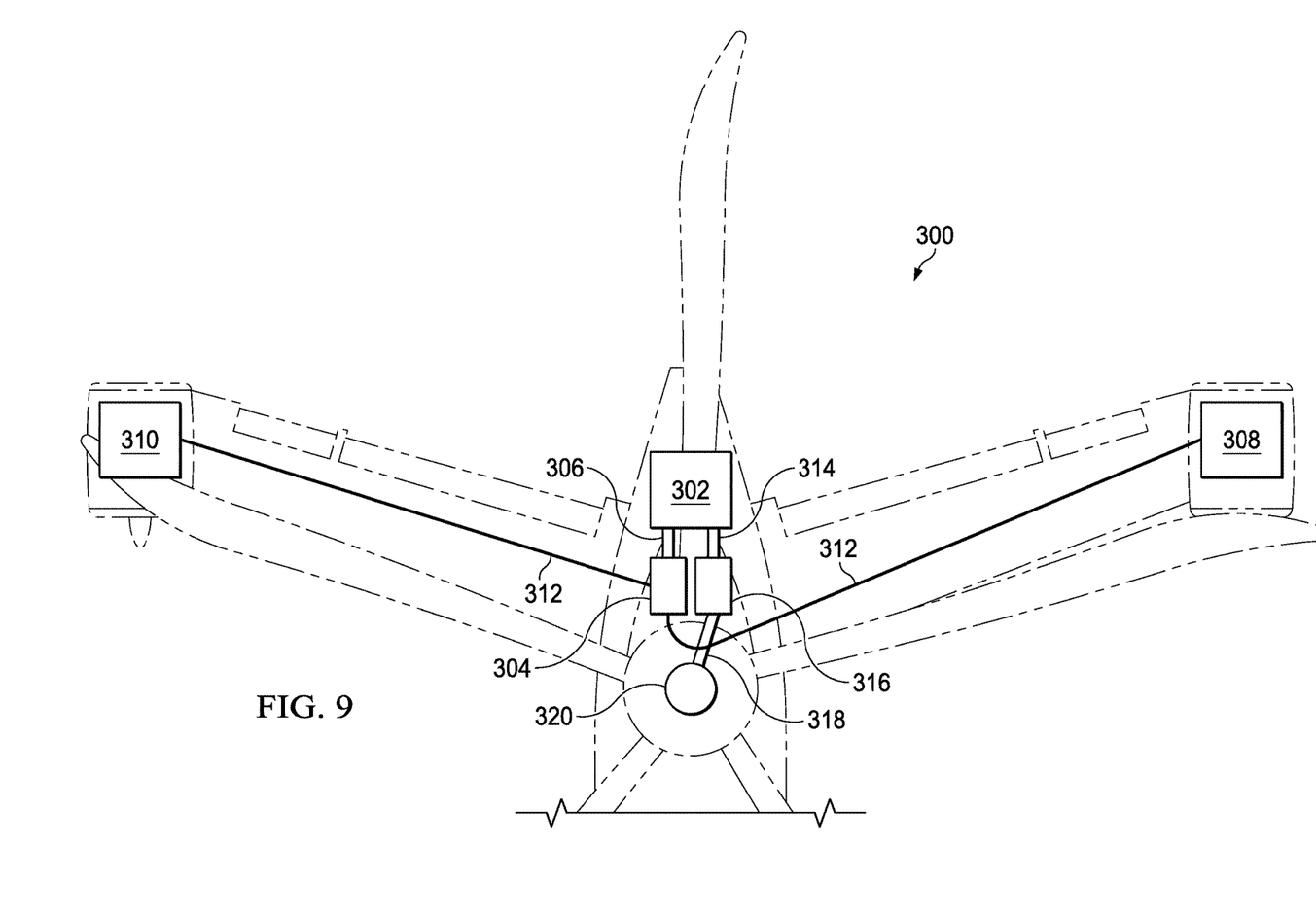
FIG. 9 is a schematic view of another helicopter of the disclosure comprising an electric generator for powering two fans while an engine mechanically drives a main rotor.

Referring now to FIG. 9, a schematic view of an alternative embodiment of a helicopter 300 is shown. Helicopter 300 is substantially similar to helicopter 200 insofar as helicopter 300 comprises an engine 302 connected to a generator 304 via a power shaft 306 and the generator 304 powers electric fans 308, 310 via electrical connections 312. However, in helicopter 300, the mast 320 remains mechanically driven by the engine 302 using a drive shaft 314, a transmission 316, and other mechanical linkages 318. While not shown, electrical connections can also be provided between the electrical generator 304 and electrical motors and/or actuators associated with moving the flaperons.

Figure 10:
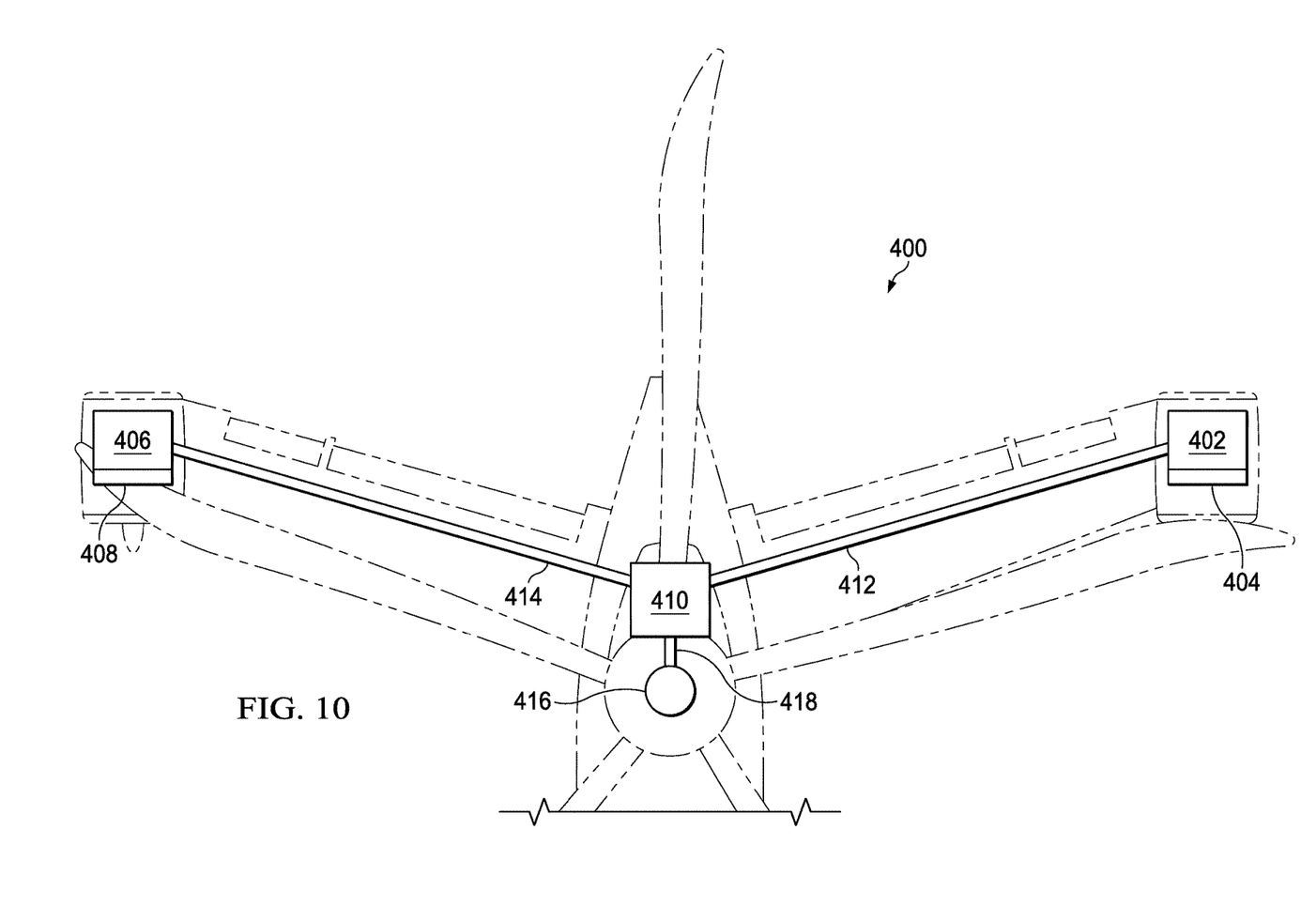
FIG. 10 is a schematic view of another helicopter of the disclosure comprising two convertible engines that can each selectively power a fan and provide power to a main rotor.

Referring now to FIG. 10, a schematic view of an alternative embodiment of a helicopter 400 is shown. Helicopter 400 comprises a first convertible engine 402 for directly powering a first thrust generator 404, a second convertible engine 406 for directly powering a second thrust generator 408, and a transmission 410 configured to receive power from the engines 402, 406 via drive shafts 412, 414, respectively, to power mast 416 via drive shaft 418. In this embodiment, a variety of power sharing options are available so that any of the first thrust generator 404, second thrust generator 408, and the mast 416 can be selectively powered by one or both of the engines 402, 406. In this embodiment, redundant engines are provided so that failure of one engine can be compensated by power sharing from the other engine. Further, in this embodiment, there is no requirement for a third centrally located engine in the fuselage.

Figure 11:
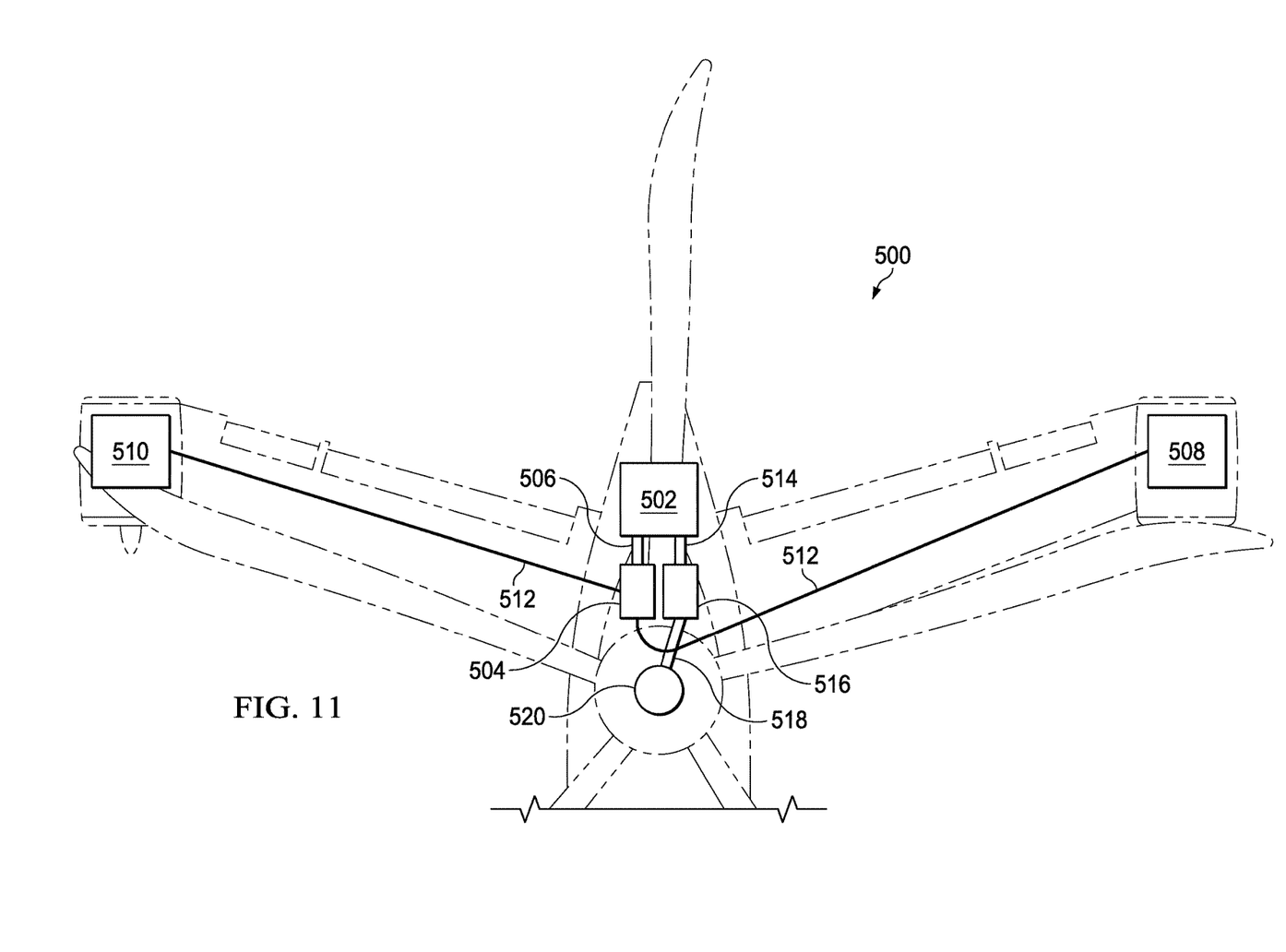
FIG. 11 is a schematic view of another helicopter of the disclosure comprising a hydraulic pump for powering two fans while an engine mechanically drives a main rotor.

Referring now to FIG. 11, a schematic view of an alternative embodiment of a helicopter 500 is shown. Helicopter 500 comprises an engine 502 connected to a hydraulic pump 504 via a power shaft 506. The hydraulic pump 504 is powered by the engine 502 and the hydraulic pump 504 powers hydraulic driven fans 508, 510 via hydraulic connections 512. The mast 520 is mechanically driven by the engine 502 using a drive shaft 514, a transmission 516, and other mechanical linkages 518. While not shown, hydraulic connections can also be provided between the hydraulic pump 504 and hydraulic actuators associated with moving the flaperons.

It will be appreciated that in alternative embodiments, one or more of the above-described thrust generators can be movable connected to a wing so that rotation of the thrust generator can provide additional lift, reverse thrust direction (in the case the thrust generator is not reversible already), and otherwise provide selective vector control of thrust output.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A helicopter, comprising:
a fuselage;
a main rotor system connected to the fuselage and configured to rotate in a rotor direction, the main rotor system comprising a retreating rotor blade side and an opposing advancing rotor blade side;
a first wing extending from the fuselage on the retreating rotor blade side, at least a portion of the first wing being located rearward relative to an axis of rotation of the main rotor system; and
a thrust generator carried by the first wing, the thrust generator being located rearward relative to the axis of rotation of the main rotor system;
wherein the helicopter comprises no tail rotor system and comprises no counter-rotating rotor system coaxial with the main rotor system; and
wherein the helicopter comprises no tail supported wing.

2. The helicopter of claim 1, further comprising:
a flaperon carried by the first wing.

3. The helicopter of claim 2, further comprising:
a second wing extending from the fuselage on the advancing rotor blade side.

4. The helicopter of claim 3, further comprising:
a flaperon carried by the second wing.

5. The helicopter of claim 3, further comprising:
a thrust generator carried by the second wing.

6. The helicopter of claim 3, further comprising:
a flaperon carried by the second wing; and
a thrust generator carried by the second wing.

7. The helicopter of claim 2, wherein the main rotor system comprises a hub and wherein hub forces are transferred to a crossmember so that hub forces are transmitted to the first wing.

8. The helicopter of claim 2, wherein the thrust generator comprises an electric motor.

9. The helicopter of claim 2, wherein the thrust generator comprises a convertible engine.

10. The helicopter of claim 2, wherein the thrust generator comprises a turbo shaft engine.

11. The helicopter of claim 10, wherein the turbo shaft engine selectively powers the main rotor system.

12. The helicopter of claim 2, wherein the helicopter comprises a single engine located centered in a left-right direction.

13. The helicopter of claim 2, wherein the thrust generator is reversible so that thrust is selectively provided in a first direction and a second direction opposite the first direction.

14. The helicopter of claim 2, wherein the helicopter comprises a generator configured to provide electrical power to the thrust generator.

15. The helicopter of claim 2, wherein the flaperon comprises a split flaperon configured to create drag for yaw control.

16. The helicopter of claim 2, wherein the thrust generator comprises a reversible electric motor and an elliptical or nonsymmetrical airfoil.

17. The helicopter of claim 2, wherein the thrust generator is movable relative to the first wing.

18. The helicopter of claim 2, wherein the thrust generator is located on a tip of the first wing.

19. The helicopter of claim 2, wherein the helicopter comprises a hydraulic pump configured to power the thrust generator.

* * * * *